United States Patent [19]

Skudrzyk

[11] Patent Number: 5,358,184
[45] Date of Patent: Oct. 25, 1994

[54] METHOD FOR SEPARATING MULTI-PLY PACKAGING MATERIAL FOR RECYCLING

[75] Inventor: Joseph Skudrzyk, Frontenac, Mo.
[73] Assignee: Elite Ink & Coatings, Ltd., Arthur, Ill.
[21] Appl. No.: 31,840
[22] Filed: Mar. 16, 1993
[51] Int. Cl.⁵ .................. B02C 19/12; B02C 23/18
[52] U.S. Cl. ........................... 241/16; 241/20; 241/24; 241/41; 241/79.1; 241/DIG. 38
[58] Field of Search .................. 241/1, 16, 20, 21, 24, 241/41, 79.1, 301, DIG. 38

[56] References Cited

U.S. PATENT DOCUMENTS

| | | | |
|---|---|---|---|
| 4,153,207 | 5/1979 | Cerroni | 241/46.17 |
| 4,154,407 | 5/1979 | Lamort | 241/38 |
| 4,160,722 | 7/1979 | Marsh | 209/4 |
| 5,104,047 | 4/1992 | Simmons | 241/20 |
| 5,115,983 | 5/1992 | Rutherford, Sr. | 241/1 |
| 5,234,172 | 8/1993 | Chupka et al. | 241/301 |
| 5,271,805 | 12/1993 | Stockel et al. | 162/16 |

Primary Examiner—Mark Rosenbaum
Assistant Examiner—John M. Husar
Attorney, Agent, or Firm—Paul M. Denk

[57] ABSTRACT

A separator for separator a paper ply from a polymer or other ply of heterogeneous, multi-ply packaging materials subjects the packaging materials to high pressure liquid delivered from a plurality of rotating nozzles. The packaging material is delivered into the chamber from a pre-wetting or soaking station. The nozzles in the chamber separate the paper from the polymer and reduces the paper to fibers. The polymer is skimmed off the top of the chamber in which the material is treated. The water and pulp are delivered to a settling tank where the paper fibers settle and water is removed. The remaining liquid and the paper fibers are delivered to a centrifugal screw where the remaining water is removed from the paper.

2 Claims, 1 Drawing Sheet

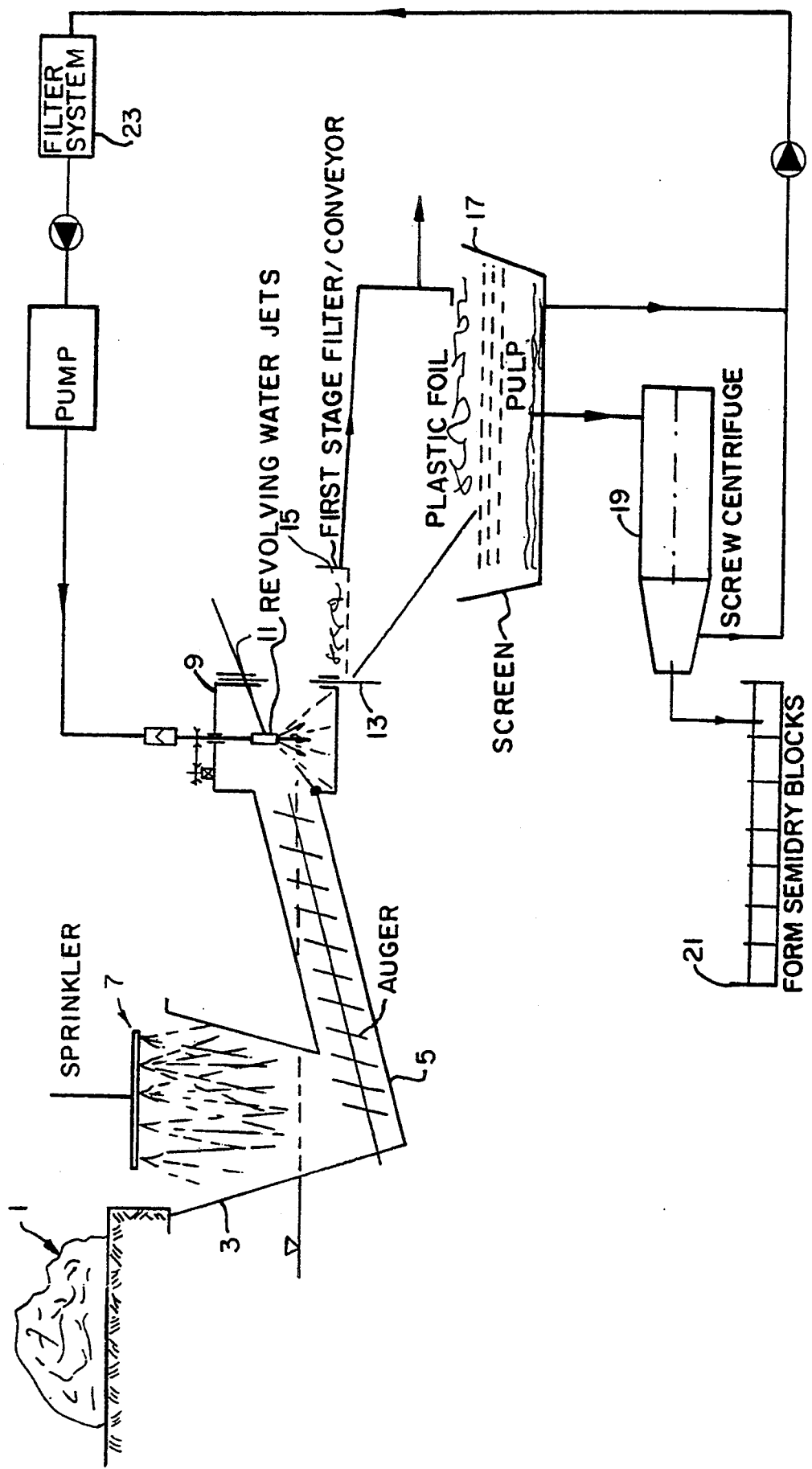

METHOD FOR SEPARATING MULTI-PLY PACKAGING MATERIAL FOR RECYCLING

BACKGROUND OF THE INVENTION

This invention relates to recycling, and, in particular, to the treatment of multi-ply, heterogeneous packaging for recycling.

Most packaging, especially that involved in the flexible packaging, is made up of a plurality of layers of a variety of plastic films, adhesives, inks and papers. These layers are firmly adhered together by adhesives or the inherent bonding action of the polymers themselves. This packaging creates a large amount of waste which must be disposed of or recycled. However, there is not practical method of disposing of or recycling this heterogeneous, multi-ply packaging material after use.

Dumping the waste packaging material in landfills is impracticable. Paper waste degrades very slowly and takes up a significant amount of landfill space. Further, the land available for waste disposal is quickly disappearing. Therefor, burying such waste does not significantly contribute to the elimination of these multi-ply packaging products and is thus not practical. Burning is also impractical. It is expensive and not all of the toxic or near toxic emissions can be captured or scrubbed out of the resulting fumes. This is especially true of packaging materials composed of a variety of different plastic and paper substrates.

There is also no known practical method the separate the plies of heterogeneous, multi-ply packaging material to recycle the various components thereof.

These packaging materials are create a disposal problem not only by consumers, but by manufacturers as well. In the manufacturer's process, upwards to 10% of the packaging material is wasted in the production of the packaging. Even if the consumer use is written off, there are literally millions of pounds of waste that could be captured at the manufacturer's level, if a practical method for recycling was available.

SUMMARY OF THE INVENTION

The object of this invention if to provide a method of treating multi-ply packaging for recycling.

Another object is to provide such a process which separates the various plies of packaging material to make the individual elements readily available for recycling.

Another object is to provide such a method which does not use chemicals in the treatment of the packaging material.

Another object is to provide such a method which physically treats the packaging.

The basic embodiment of the invention combines a mechanical feeder with a presoaking vessel. The wet waste paper is carried by screw feeder into the area where high pressure liquid jets are installed. The waste paper under the jets action is disintegrated into fibers and separated from the plastic foil. To achieve a high efficiency of this process, liquid jet should be organized in such manner to attack as biggest as possible waste paper volume in a given unit of time. For that the revolving jets with different attack angle are applied and are driven by a mechanical drive system at a calibrated rotational speed. This speed, and the pressure and diameter of the nozzles is controlled by the size of the unit, and the amount of waste which must be processed through the unit in each hour.

BRIEF DESCRIPTION OF THE FIGURES

The FIGURE is a schematic representation of a process according to the present invention, for separating multi-ply material for recycling.

DESCRIPTION OF THE PREFERRED EMBODIMENT

The process of the invention is schematically shown in the FIGURE. Laminated paper waste, or other multi-ply, heterogeneous waste 1 is placed into a chute 3 which delivers the waste to an auger 5. A sprinkler 7 wets waste 1 in chute 3 as the waste is delivered to auger 5. Auger 5 then delivers the wetted waste into a chamber 9 wherein the waste is subject to the action of high pressure water jets 11. The jets separate the paper from its plastic laminate by disintigrating the paper, breaking the paper ply into its component fibers. The paper thus ends up in a liquid mixture, and the laminate floats on top of the liquid. There are preferably a plurality of jets 11 all of which are rotating jets, which can be attained from a high water pressure rotatable valve. The various Jets are designed to operate at different pressures and rates of water delivery. The various jets are also positioned to apply the water jet at different angles.

After a predetermined time in chamber 9, the liquid as waste is removed therefrom. The time is a function of the amount of waste in chamber 9, the pressure of the water jets, the rate of water delivery therefrom, and the physical properties of the waste being treated. When the liquid and laminate are removed from chamber 9, they pass through an adjustable filter 13. Filter 13 separates a majority of the laminate from the paper. The laminate is carried away by a conveyor 15 to a baler where the laminate is collected for later processing. The paper/liquid is delivered to a settling tank 17 to separate smaller pieces of laminate which passed through filter 13 from the paper pulp. The remaining laminate floats to the top of tank 17, while the paper pulp sinks to the bottom. The pulp and the water are delivered to a separator 19, preferably a screw centrifuge, where the water is removed from the pulp by centrifugal action. Some of the water from tank 17 may be drained therefrom prior to the delivery of the pulp to separator 19. From separator 19, the pulp is delivered to a collector 21 and the water is recirculated back to jets 11. Collector 21 may organize the pulp into blocks for shipping.

The water used to separate the plies and disintegrate the paper is recycled. The water from separator 19 and tank 17 is passed through a filter system 23 which will remove small particles which may clog jets 11, and a pump which returns the water to jets 11 and supplies the pressure for the jets 11.

The high pressure water jets attack the border between the materials to separate the various plies of the packaging material. By specific control of volume and pressure of the liquid jets, the plies of the packaging are separated as they react to the specific conditions of the water jet. Because the plies have different properties, i.e. specific gravity, density, and other physical characteristics, they will react differently to the jet thereby facilitating separation. The separation process is, thus, possible because of significant differences of the mechanical and physical properties between the various substrates. For example, the physical properties of a 30-pound basis weight paper vs. a 40-gauge PET film are significantly different. The jet action of the liquid can be set for a pressure, volume, and angle of dispersion which will not affect the PET plastic, but which will disintegrate the paper fiber, thereby separating the paper from the plastic film. The paper can then be drained off in a sludge form and the film can be floated off to be gathered. The paper and film can then be processed separately from each other.

The energy necessary, in horsepower (Hp) for separating the plies is a function of the pressure (P) generated by pump and volume (Q) of the liquid discharged from the nozzle per unit time:

$$Hp = \frac{Q(GPM) \times P(PSI)}{1450}$$

The power necessary to treat the waste is also a function of the waste volume treated per unit time. A desired volume of paper must be subjected to the jets for a minimum time to separated from the foil or plastic (and disintegrated) This exposure time can be adjusted by changing the number of nozzles, water discharge volume, revolving speed of the nozzle or the pressure of the jet. Also the nozzle placement and the jet angle attack can affect the paper exposure time when a more complex multi-layer heterogeneous material is recycled. Preferably, the nozzle has an orifice of 0.040", a pressure of 10,000 PSI, and revolves at a rate of 200 rpm. Adjustability of the energy involved in this process helps to produce the paper pulp as a high quality product having properties equivalent to virgin pulp.

The revolving jets can have different attack angles, volumes of liquid, and pressure, and can be applied and driven at calibrated rotational speeds depending upon the characteristics of the various waste elements to be attacked. This speed and the pressure and the diameter of the nozzle controls the reaction and attack of the specific physical characteristics of each individual element in the waste being processed to affect the separation and the amount of disintegration.

The unique action of the interplay of the position, volume and pressure of the liquid jets applied to the separating the elements and producing a desired and predetermined amount of physical deterioration of each element. This enables the use of such techniques as floating, draining, filtering and settling to isolate and collect the individual elements in designated areas for processing to be recycled or disposed of under controlled conditions.

The foregoing description is set forth for illustrative purposes only. Variations, within the scope of the appended claims, may be apparent to those skilled in the art.

Having thus described the invention, what is claimed and desired to be secured by Letters Patent is:

1. A method of treating heterogenous, multi-ply material for recycling, wherein said heterogenous material being packaging material, comprising:
   pre-soaking the package material prior to introduction of said material into said chamber;
   introducing said material into said chamber, the step of introducing said material comprises continuously feeding said material into said chamber with an auger;
   said material being introduced into said auger by a communicating chute;
   the presoaking of said material occurring in said chute;
   subjecting said material to high pressure liquid to separate the plies of the packaging material, subjecting said material to high pressure liquid comprises passing said liquid through at least one nozzle to form liquid jets, and rotating said at least one nozzle;
   removing said separated packaging material from said chamber;
   said removal step includes passing said treated material through an adjustable filter to remove any plastic plies from the paper plies of the recycled packaging material;
   carrying away said plastic plies from said chamber; and,
   separating said treated paper plies from the liquid, said paper/water separating step includes settling said paper, said paper/water separating step further includes a step of centrifuging said treated paper and said liquid.

2. A separator for separating plies of heterogeneous, multi-ply packaging products for recycling of the components of said packaging, the separater including:
   a pre-soaking station, said pre-soaking station including a chamber;
   a second chamber in which said packaging material is treated, said chamber including an inlet, an outlet, and at least one nozzle which delivers a high pressure stream of water at said material to separate a paper ply from a polymer ply, a feeder for feeding said material into said second chamber from said first pre-soaking chamber;
   a feeder for feeding said material into said chamber, said feeder including an auger;
   said second chamber further includes a plurality of nozzles which delivers said high pressure water, said nozzles are mounted upwardly within said chamber for rotation, said nozzles delivering liquid at differing pressures, water velocities, and angles, towards the packaging material to be separated;
   a filter, at said chamber outlet, which removes the separated polymer from the paper, and further including a settling tank in communication with said second chamber, said settling tank receiving said liquid and said separated paper, a liquid/paper separator for removing the liquid from said treated paper, wherein said liquid paper separator includes a centrifugal screw;
   a liquid and paper conduit which delivers liquid/paper from said settling tank and said liquid/paper separator to means for forming semidrive blocks of the separated paper; and
   a pump in said liquid conduit, and a filter system in said conduit upstream from said pump for filtering the liquid from said settling tank for a return to the nozzle for reusage.

* * * * *